United States Patent [19]

Suzuki et al.

[11] Patent Number: 5,050,002
[45] Date of Patent: Sep. 17, 1991

[54] CIRCUIT FOR DETECTING A DROP-OUT OF A FREQUENCY MODULATED VIDEO SIGNAL

[75] Inventors: Hideto Suzuki; Teruyuki Yoshida; Hideki Arai, all of Kanagawa, Japan

[73] Assignee: Sony Corporation, Tokyo, Japan

[21] Appl. No.: 511,983

[22] Filed: Apr. 13, 1990

Related U.S. Application Data

[63] Continuation of Ser. No. 203,804, Jun. 8, 1988, abandoned.

[30] Foreign Application Priority Data

Jun. 8, 1987 [JP] Japan .............................. 62-142446

[51] Int. Cl.⁵ .............................................. H04N 5/94
[52] U.S. Cl. .................................... 358/336; 358/314; 360/38.1
[58] Field of Search ............... 360/38.1; 358/314, 336, 358/335, 310

[56] References Cited

U.S. PATENT DOCUMENTS

| | | | |
|---|---|---|---|
| 3,865,981 | 2/1975 | Welch et al. | 360/38.1 |
| 3,925,811 | 12/1975 | Kenny | 358/314 |
| 4,017,895 | 4/1977 | Oprand et al. | 366/38.1 |
| 4,119,812 | 10/1978 | Fox | 358/336 |
| 4,499,570 | 2/1985 | Schouhamer Immink et al. | 360/38.1 |
| 4,510,530 | 4/1985 | Miura et al. | 358/314 |
| 4,604,659 | 8/1989 | Itoh et al. | 360/38.1 |
| 4,623,994 | 11/1986 | Nabshima et al. | 360/38.1 |
| 4,737,723 | 4/1988 | Mita | 360/38.1 |

FOREIGN PATENT DOCUMENTS 57-27637  6/1982  Japan .

Primary Examiner—Roy N. Envall, Jr.
Assistant Examiner—Huy Nguyen
Attorney, Agent, or Firm—Lewis H. Eslinger; Donald S. Dowden

[57] ABSTRACT

A drop-out detecting circuit forms a drop-out detecting signal on the basis of the result of comparing the frequency of a frequency modulated video signal reproduced from a slant track on a magnetic tape with a reference frequency. The level of a reproduction state detecting signal formed on the basis of the envelope of the reproduced frequency modulated video signal is compared with a predetermined level and the above reference frequency is varied on the basis of the compared result.

3 Claims, 4 Drawing Sheets

CIRCUIT FOR DETECTING A DROP-OUT OF A FREQUENCY MODULATED VIDEO SIGNAL

This is a continuation of application Ser. No. 07/203,804, filed June 8, 1988, now abandoned.

BACKGROUND OF THE INVENTION

1. Field of the Invention

The present invention relates generally to circuits for processing a reproduced video signal. More particularly, this invention relates to a method for detecting a drop-out of a frequency modulated video signal and a drop-out detecting circuit for use in the reproducing system of a video tape recorder (VTR).

2. Description of the Prior Art

In the art it is known that in the reproducing system of a video tape recorder (VTR), there is employed a drop-out compensating apparatus for detecting whether or not a reproduced video signal contains a drop-out. According to this drop-out compensating apparatus, when the reproduced video signal contains a drop-out, the drop-out portion thereof is replaced with a signal of one horizontal period before, it is replaced with a signal of grey level or the level of an immediately-preceding signal is held in order to compensate for the drop-out.

As a drop-out detecting circuit used in the above-mentioned drop-out compensating apparatus, Japanese published patent gazette No. 57-27637 discloses such a drop-out detecting circuit that is arranged to detect a drop-out by detecting the frequency of a reproduced frequency modulated video signal.

When dust or the like enters the space between a magnetic reproducing head and a magnetic tape, so-called spacing loss occurs. This spacing loss lowers the level of a high band component of a reproduced frequency modulated video signal, causing a drop-out. At this time, in the reproduced frequency modulated video signal, the level of its lower side band goes high as compared with that of its carrier signal and the frequency component of the lower end of the lower side band becomes dominant so that this frequency is regarded as the carrier.

By effectively utilizing the above-mentioned features, the frequency component of the reproduced frequency modulated video signal which is regarded as the carrier is detected to detect the drop-out.

Meanwhile, when the video signal is emphasized and then frequency modulated in the recording system of the video tape recorder, there exists a peak portion of a video signal which is extended to the region lower than the black level with the result that the frequency of the carrier of the reproduced frequency modulated video signal is lowered to the frequency band of the side band lower than the frequency of the carrier corresponding to a video signal ranging from a sync. tip level to the white peak level.

In view of the above-mentioned aspect, it is proposed that a drop-out is detected by the fact that a frequency lower than that of a carrier corresponding to the peak portion of the video signal extended to the black level side and which is somewhat lower than the center frequency of the lower side band of the carrier corresponding to the video signal from the sync. tip level to the white peak level is taken as a reference frequency and that it is detected when the frequency of the reproduced frequency modulated video signal which is regarded as the carrier becomes lower than the reference frequency.

If the reference frequency is determined as set forth above, when upon playback with variable tape speed a magnetic reproducing head scans over two slant tracks across a guardband portion simultaneously, at the portion where the phases of the carrier signals reproduced from the two slant tracks differ from each other by 180° C., these carrier signals cancel each other out. Thus, the levels thereof are considerably lowered, being regarded as a drop-out. At that time, the phases of the lower side band reproduced from two slant tracks are scarcely different by 180°, and hence, the signal components thereof rarely cancel each other out, because the frequencies thereof are different from the carrier frequency. Thus, the level of the lower side band becomes higher than that of the carrier at that time, the level of the higher end of the lower side band is relatively high so that when the higher end of the lower side band is regarded as the carrier the frequency thereof becomes higher than the reference frequency. As a result, although the drop-out occurs, it cannot be detected.

OBJECTS AND SUMMARY OF THE INVENTION

Accordingly, it is an object of the present invention to provide an improved method for detecting a drop-out and an improved drop-out detecting circuit.

It is another object of the present invention to provide a drop-out detecting circuit and a drop-out detecting method which can detect, without malfunction, a drop-out caused when a frequency modulated video signal recorded on the slant track is reproduced in the normal playback mode or playback mode with variable tape speed.

It is a further object of the present invention to provide a drop-out detecting method and circuit suitable for use with a reproducing system of a video tape recorder.

According to an aspect of the present invention, there is provided a method of detecting a drop-out of a frequency modulated video signal reproduced from a slant track on a tape, comprising the steps of:

(a) detecting whether a reproducing head is scanning over the slant tracks according to an envelope of the frequency modulated video signal;

(b) detecting whether a frequency of the frequency modulated video signal is lower than a first predetermined frequency in a lower side band frequency region of the frequency modulated video signal when the reproducing head is not scanning over the slant tracks, whether a frequency of the frequency modulated video signal is lower than a second predetermined frequency between the lower side band frequency region and a carrier frequency region of the frequency modulated video signal when said reproducing head is scanning over the slant tracks; and (c) outputting a drop-out detecting signal when the frequency of the frequency modulated video signal is lower than said first predetermined frequency or said second predetermined frequency.

According to another aspect of the present invention, there is provided a drop-out detecting circuit for detecting a drop-out of a frequency modulated video signal reproduced from a slant track on a tape, comprising:

(a) first detecting means for detecting whether a reproducing head is scanning over the slant tracks according to an envelope of the frequency modulated video signal; and (b) second detecting means for detecting whether a frequency of the frequency modulated video signal is lower than a first predetermined frequency in a lower side band frequency region of the frequency modulated video signal when said first detecting means detects that said reproducing head is not scanning over the slant tracks, whether the frequency of the frequency modulated video signal is lower than a second predetermined frequency between said lower side bank frequency region and a carrier frequency region of said frequency modulated video signal when said first detecting means detects that said reproducing head is scanning over the slant tracks, and said second detecting means outputs a drop-out detecting signal when the frequency of the frequency modulated video signal is lower than said first predetermined frequency or said second predetermined frequency.

According to a further aspect of the present invention, there is provided a drop-out detecting circuit for detecting a drop-out in a frequency modulated video signal reproduced from a slant track on a tape, comprising:

1) first level comparing means for comparing an envelope level of the frequency modulated video signal with a first reference level, and outputting an output signal according to comparative results;

2) second level comparing means for comparing a level of the frequency modulated video signal with a second reference level lower than said first reference level and outputting a rectangular waveform signal; and 3) period detecting means for detecting whether a period of the rectangular waveform signal is lower than a reference period determined by the output signal of said first level comparing means, and outputting a drop-out detecting signal.

These and other objects, features and advantages of the present invention will become apparent from the following detailed description of the preferred embodiments to be taken in conjunction with the accompanying drawings, throughout which like reference numerals identify like elements and parts.

DETAILED DESCRIPTION OF THE PREFERRED EMBODIMENTS

The present invention will now be described with reference to the accompanying drawings.

Figure 1:
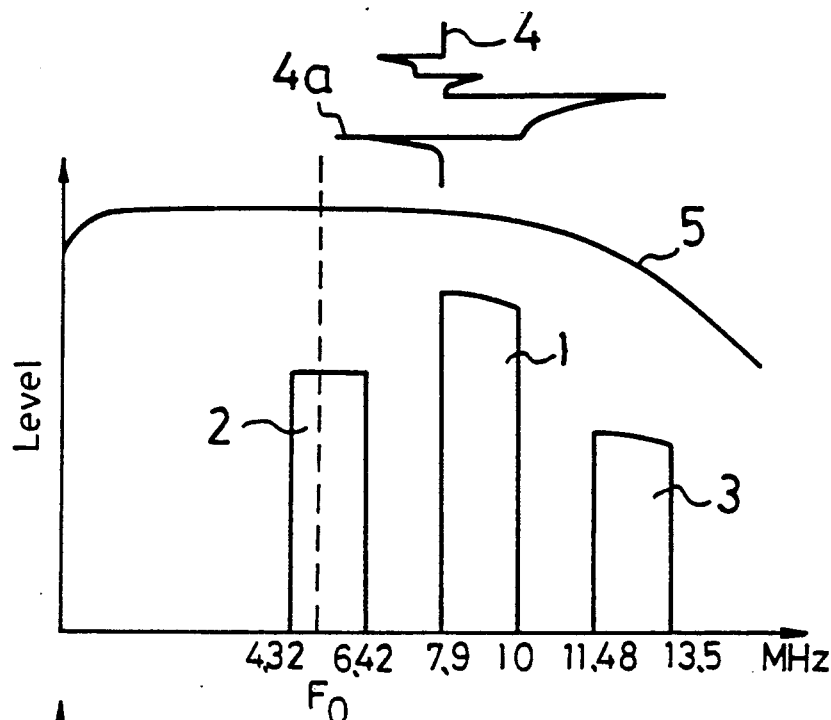
FIG. 1 is a schematic representation of a frequency spectrum in the normal playback mode.
Figure 2:
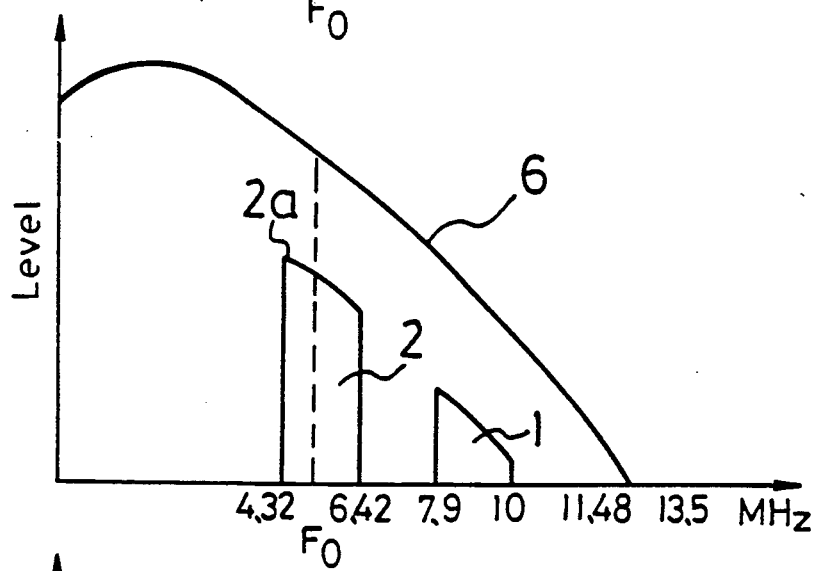
FIG. 2 is a schematic representation of a frequency spectrum in which a drop-out occurs in the playback mode at the normal tap speed.
Figure 3:
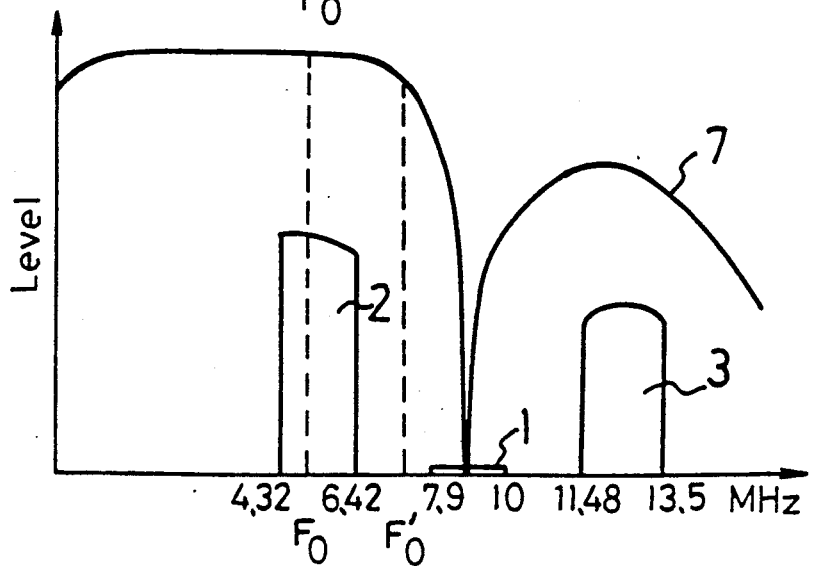
FIG. 3 is a schematic representation of a frequency spectrum of a reproduced frequency modulated video signal in the variable tape speed playback mode.

First, let us explain frequency characteristics and frequency spectra of reproduced frequency modulated video signals which are reproduced under different conditions with reference to FIGS. 1 to 3.

FIG. 1 illustrates a frequency spectrum of a reproduced frequency modulated video signal reproduced under normal playback mode in which a magnetic head accurately scans over a track, for example, slant track on a magnetic tape. As FIG. 1 shows, the reproduced frequency modulated video signal is formed of a carrier band 1 ranging, for example, from 7.9 MHz to 10 MHz corresponding to the pedestal level to the white peak level of the video signal, a lower side band 2 ranging from 4.32 MHz to 6.42 MHz and an upper side band 3 ranging from 11.48 MHz to 13.5 MHz. Comparing the levels of the respective bands, it is thus noted that the level of the carrier 1 is highest and that the levels of the lower side band 2 and the upper side band 3 are lower than that of the carrier 1. A black level peak portion 4a of an emphasized video signal 4 becomes, if it is frequency modulated, a frequency within the frequency band of the lower side band 2 as shown in FIG. 1.

Also, as shown by a solid line 5 in FIG. 1, upon the normal reproduction the frequency characteristic of the reproduced FM (frequency modulated) video signal is presented such that the level thereof is gradually decreased as the frequency is higher.

Upon normal reproduction mode, when dust or the like enters the space between the magnetic head and the magnetic tape to produce a so-called spacing loss to thereby cause the drop-out, the frequency characteristic 6 of the resultant reproduced frequency modulated video signal is rapidly lowered in level as the frequency is higher as shown in FIG. 2. Thus, the reproduced FM video signal becomes smaller in reproduction level as the frequency is higher. Therefore, as illustrated in the diagram of frequency spectrum of FIG. 2, the level of the lower side band 2 is higher than the level of the carrier 1 and further within the frequency band of the lower side band 2, a lower band component 2a thereof is higher than that of the other. Thus, the low band component 2a of the lower side band 2 is regarded as the carrier.

When upon playback mode with a variable tape speed the magnetic head scans over two slant tracks at the same time, there is a case that the phases of the carrier signals 1 reproduced from two slant tracks differ from each other by 180°. At this time, these carrier signals cancel each other out so that the level thereof becomes very small. At that time, however, the phases of the lower side band 2 reproduced from two tracks rarely differ from each other by 180° because the frequencies thereof are different from that of the carrier signal 1. Thus, the signal components of the lower side band 2 rarely cancel each other out. In like a manner, at that time, the signal components of the upper side band 3 do not cancel each other out. FIG. 3 illustrates a frequency characteristic 7 of a reproduced FM video signal which is presented upon playback mode with variable tape speed. In this case, the phases of the carrier signals 1 simultaneously reproduced from two tracks differ from each other by 180°. As shown in FIG. 3, the level of the frequency characteristic 7 is suddenly decreased in the frequency band of the carrier signal 1 so that the level of the lower side band 2 becomes higher than that of the carrier signal 1. This state presents a drop-out.

Now, an embodiment of a drop-out detecting circuit according to the present invention will hereinafter be described with reference to FIGS. 4 and 5. The drop-out detecting circuit of the present invention is arranged to utilize a difference between frequency characteristics of the frequency modulated video signal presented under the different reproduction conditions. This embodiment is the application to the reproducing system of the video tape recorder.

Figure 4:
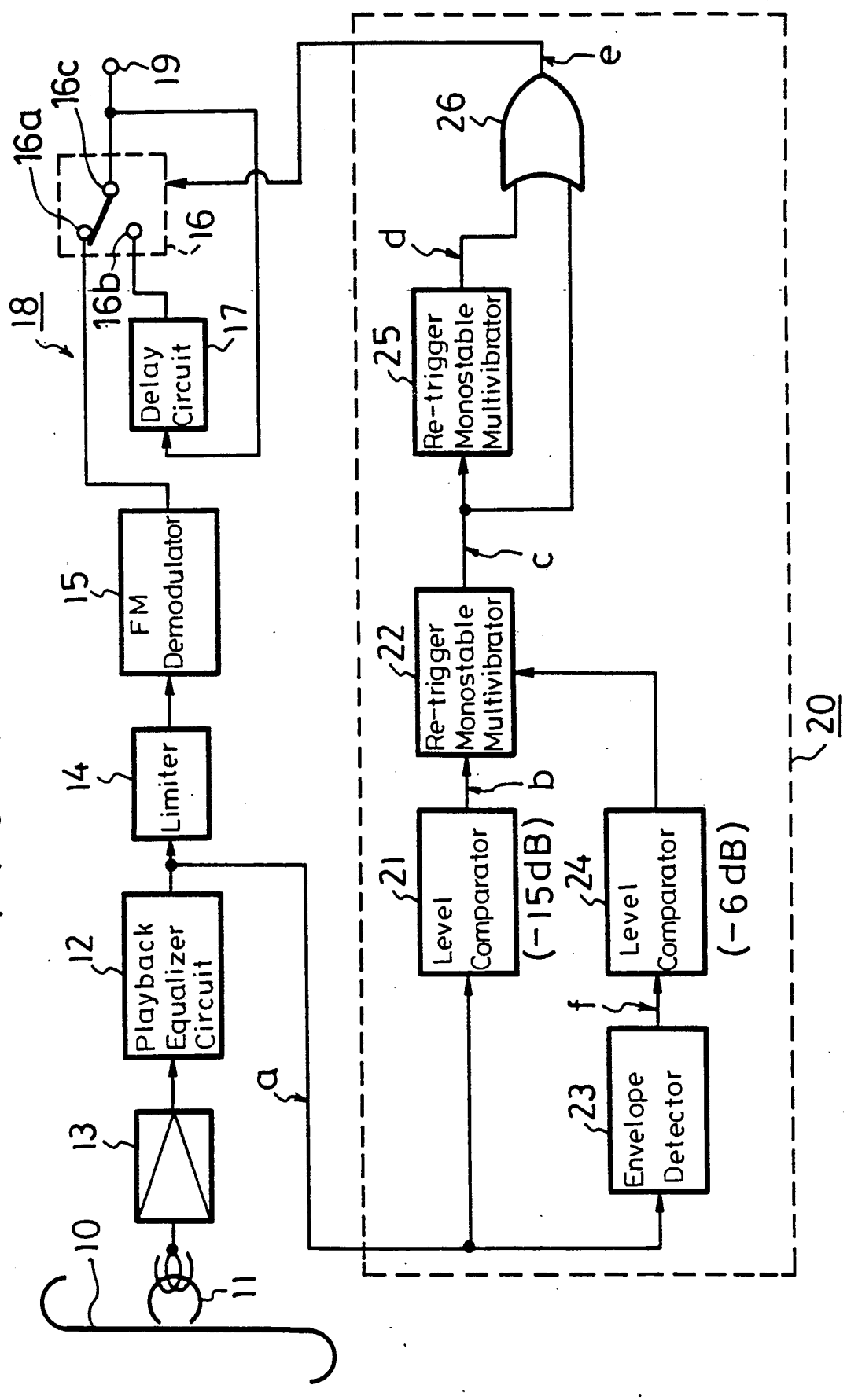
FIG. 4 is a block diagram showing an embodiment of a drop-out detecting circuit according to the present invention.

As FIG. 4 shows, there is shown a magnetic tape 10 on which is recorded a frequency modulated (FM) composite color video signal so as to form slant tracks thereon. The frequency modulated composite color video signal recorded is reproduced from the magnetic tape 10 by a rotary magnetic reproducing head 11. A playback equalizer circuit 12 is provided at the next stage of a pre-amplifier 13. The output from the playback equalizer circuit 12 is supplied through a limiter 14 to an FM-demodulator 15 which demodulates a composite color video signal. The demodulated video signal from the FM-demodulator 15 is supplied to a fixed contact 16a of a change-over switch 16. The change-over switch 16 and a H delay circuit 17 constitute a drop-out compensator 18 where H represents one horizontal period. The movable contact 16c of the change-over switch 16 is connected to an output terminal 19 and is also connected through the 1H delay circuit 17 to the other fixed contact 16b of the change-over switch 16. The change-over switch 16 is changed in position in response to an output of a drop-out detecting circuit 20 which will be described next.

The drop-out detecting circuit 20 will be explained. The frequency modulated composite color video signal (hereinafter, referred to as a frequency modulated video signal, for simplicity) a from the playback equalizer circuit 12 is fed to a level comparator 21. The level comparator 21 compares the frequency modulated video signal a with a reference level of, for example, −15 dB to produce a rectangular waveform signal b. The rectangular waveform signal b, which is the output signal from the level comparator 21, is supplied to a first re-trigger monostable multivibrator 22.

The inherent or intrinsic stable period τ1 of the first re-trigger monostable multivibrator 22 can be varied in response to the reproduction state as will be described later. The frequency modulated video signal a from the playback equalizer circuit 12 is supplied to an envelope detector 23. An output signal f of the envelope detector 23 is supplied to a level comparator 24, in which it is compared with a reference level of, for example, −6 dB which is higher than the reference level mentioned above (−15 dB). The output signal from the level comparator 24 is supplied to the stable period control terminal of the re-trigger monostable multivibrator 22 to control the duration of such a stable period τ1.

Meanwhile, the output signal c of the first monostable multivibrator 22 is supplied to a second re-trigger monostable multivibrator 25. The inherent or intrinsic stable period τ2 of the second re-trigger monostable multivibrator 25 is selected to be sufficiently longer than the above-mentioned stable period τ1 of the first re-trigger monostable multivibrator 22. The rectangular waveform signals c and d from the monostable multivibrators 22 and 25 are both supplied to an OR gate 26 which derives a drop-out detecting signal e. This drop-out detecting signal e is fed to the change-over switch 16 in the drop-out compensator 18.

The principle of the operation of the embodiment of the present invention will be described with reference to FIGS. 1 to 5.

As shown in FIG. 5A, the frequency modulated video signal a reproduced from the magnetic tape 10 by the rotary magnetic reproducing head 11 and passing through the playback equalizer circuit 12 presents different average levels during a period P in which the magnetic head 11 accurately scans over the slant tracks on the magnetic tape 10 and during a period Q in which the magnetic head 11 scans over the slant tracks across the guardband portion.

Also, as shown in FIG. 5A, there appears a drop-out occurring period R in which a drop-out occurs because the level of the frequency band component of the reproduced frequency modulated video signal is lowered as its frequency becomes higher (see FIG. 2) by the spacing loss caused by dust or the like entering into the space between the magnetic head 11 and the magnetic tape 10 when the magnetic head 11 accurately scans over the slant tracks. Therefore, during the drop-out period R, the frequency of the reproduced signal becomes low.

There appears a drop-out occurring period S as shown in FIG. 5A in which when the magnetic head 11 scans over the slant tracks across the guardband portion, the phases of the carrier signals 1 reproduced from two slant tracks differ from each other by 180°, making the level of the carrier signal 1 very small, thus to cause the high band component of the lower side band 2 to be regarded as a carrier signal (see FIG. 3). Also in this period S, the frequency of the reproduced signal is lowered.

The envelope detector 23 which detects the envelope of the reproduced frequency modulated video signal a has a large time constant so that the output signal f thereof does not follow the momentary fluctuation of the reproduced frequency modulated video signal a unlike the drop-out caused in the normal playback mode but presents a dulled curve as shown in FIG. 5A. The output signal f from the envelope detector 23 is fed to the level comparator 24 and is thereby compared with the reference level m (FIG. 5A) of −6 dB.

The output signal, indicating the compared result, produced from the level comparator 24 is supplied to the inherent stable period control terminal of the first re-trigger monostable multivibrator 22, by which when the level of the output signal f from the envelope detector 23 is higher than −6 dB, or during the normal playback period P, the above-mentioned reference frequency is determined to be a frequency F₀ slightly lower than the frequency corresponding to the black level side peak portion 4a of the emphasized video signal, for example, a frequency of 4.5 MHz as shown in FIGS. 1 and 2, while when the level of the output signal f from the envelope detector 23 is lower than −6 dB, or during the period Q in which the magnetic head 11 scans over the slant tracks across the guardband portion, the reference frequency is determined to be a frequency F₀' between the frequency band of the lower side band 2 and the frequency band of the carrier signal 1 as shown in FIG. 3.

When receiving the frequency modulated video signal a shown in FIG. 5A, the level comparator 21 compares it with the reference level of λ −15 dB to produce the rectangular waveform signal b which is shown in FIG. 5B. This rectangular waveform signal b is supplied to the first re-trigger monostable multivibrator 22 to trigger at its leading edge the first re-trigger monostable multivibrator 22. At this time, during the drop-out period R in the normal playback mode, the width between the leading edges of the adjacent rectangular waveform signals b from the level comparator 21 becomes wider than the first intrinsic stable period $\tau 1$ of the first re-trigger monostable multivibrator 22 with the result that the first re-trigger monostable multivibrator 22 produces the rectangular waveform signal c shown in FIG. 5C.

When upon playback mode with variable tape speed the magnetic head 11 scans over the slant tracks across the guardband portion, as illustrated in the period Q in FIG. 5A, the output signal f from the envelope detector 23 becomes lower than the second reference level m of $-6$ dB so that the intrinsic stable period $\tau 1$ of the first re-trigger monostable multivibrator 22 is changed to a second monostable period $\tau 1'$ ($\tau 1 > \tau 1'$) which corresponds to an inverse number of the frequency $F_0'$ between the frequency band of the carrier signal 1 and the frequency band of the lower side band 2. Thus, also in the drop-out occurring period S, the width between the leading edges of the adjacent rectangular waveform signals b from the first level comparator 21 becomes wider than the second intrinsic stable period $\tau 1'$ of the first re-trigger monostable multivibrator 22 so that the first re-trigger monostable multivibrator 22 produces the rectangular waveform signal c.

The rectangular waveform signal c from the first re-trigger monostable multivibrator 22 triggers at its trailing edge the second re-trigger monostable multivibrator 25, causing the second re-trigger monostable multivibrator 25 to produce the rectangular waveform signal d shown in FIG. 5D. The rectangular waveform signals c and d are supplied to the OR circuit 26 which derives a drop-out detecting pulse e shown in FIG. 5E. This drop-out detecting pulse e is supplied to the change-over switch 16 in the drop-out compensator circuit 18 to compensate for the drop-out.

Figure 5:
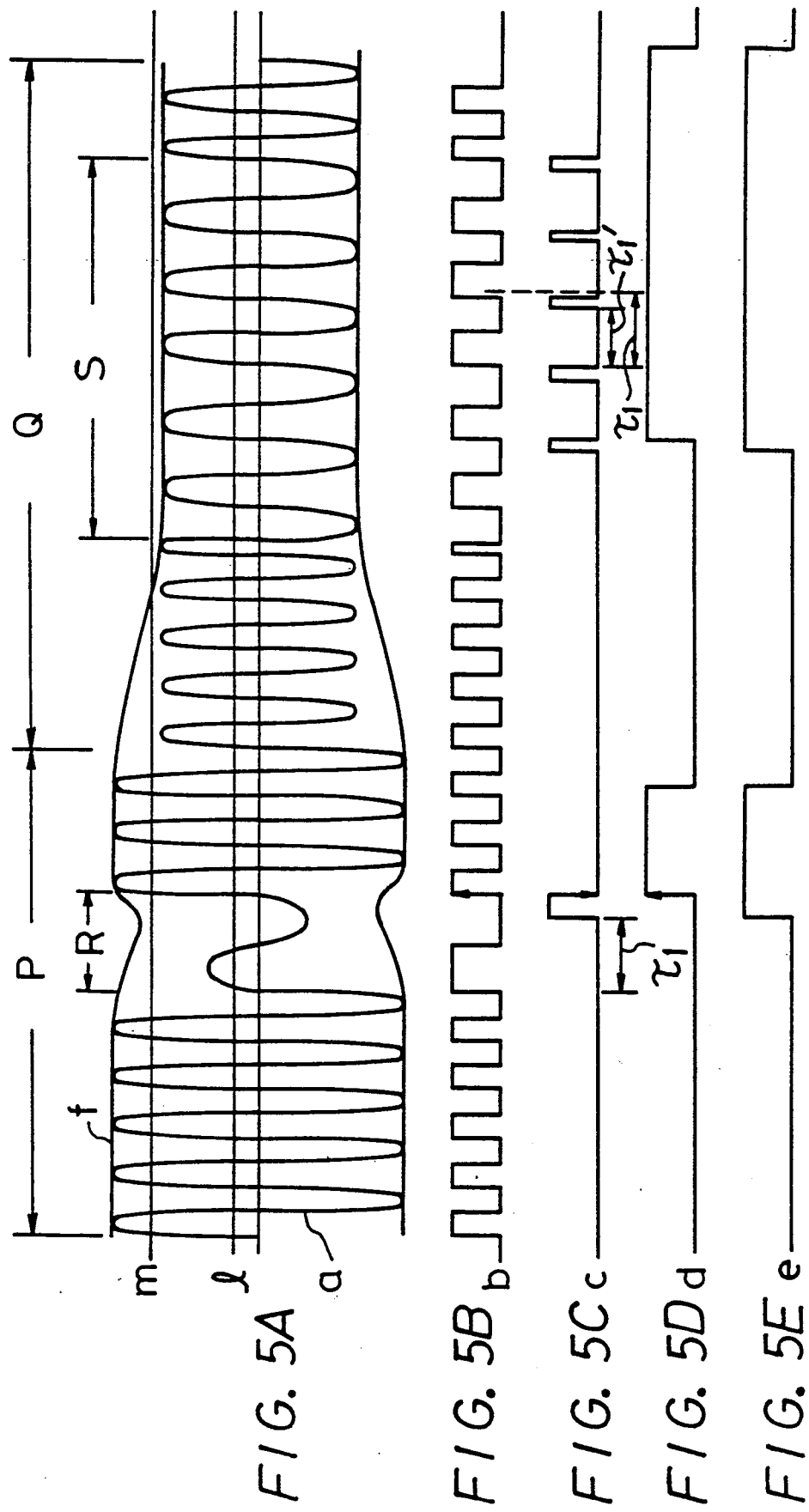
FIGS. 5A to 5E are waveform diagrams used to explain the operation of the drop-out detecting circuit of the present invention shown in FIG. 4.

According to the present invention, as shown in FIGS. 4 and 5, even when upon playback mode with variable tape speed the magnetic head scans over the two slant tracks across the guardband portion at the same time, it is possible to positively detect the drop-out. Further, in the normal reproduction mode, it can be avoided that the peak portion of the emphasized video signal at its black level side is mis-detected as a drop-out.

Figure 6:
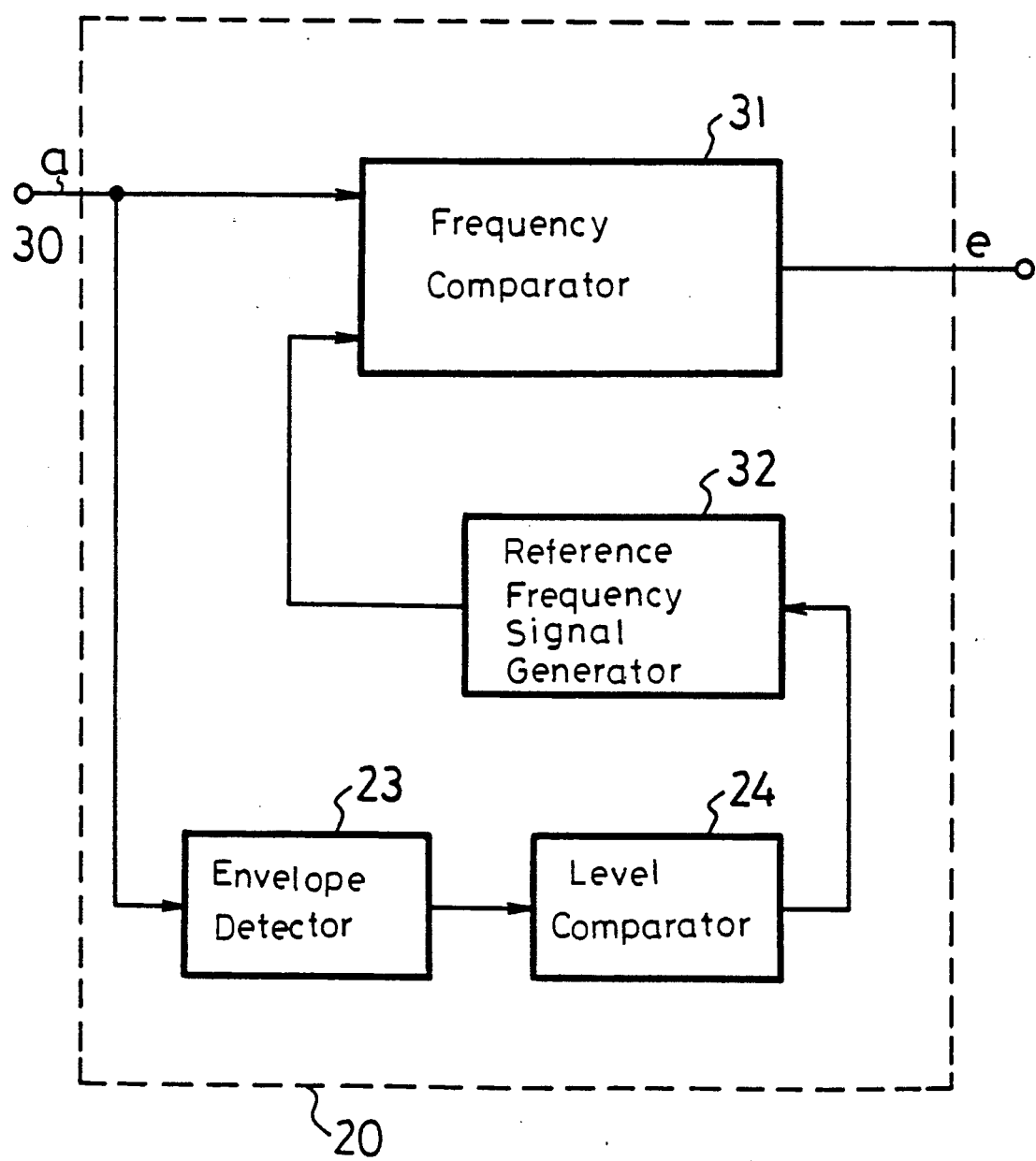
FIG. 6 is a block diagram showing another embodiment of the drop-out detecting circuit according to the present invention.

FIG. 6 illustrates another embodiment of the drop-out detecting circuit 20 according to the present invention.

As FIG. 6 shows, the FM-modulated video signal a from the playback equalizer circuit 12 shown in FIG. 4 is supplied to a terminal 30 and is then fed to the envelope detector 23 and a frequency comparator 31. The envelope detector 23 and the next stage of the level comparator 24 are the same as those previously described in connection with FIG. 4 and therefore need not be described in detail.

The output signal from the level comparator 24 is supplied to a reference frequency signal generator circuit 32. In response to the output signal from the level comparator 24, the reference frequency signal generator circuit 32 generates and supplies to the frequency comparator 31 a first reference frequency signal having the frequency equal to the reference frequency $F_0$ shown in FIG. 1 when the level of the output signal f of the envelope detector 23 is higher than the reference level associated therewith or or $-6$ dB for example. When on the other hand the level of the output signal f from the envelope detector 23 is lower than $-6$ dB, the reference frequency signal generator circuit 32 generate and supplies to the frequency comparator 31 a second reference frequency signal having the frequency equal to the reference frequency $F_0'$ shown in FIG. 3.

The frequency comparator 31 compares the frequency of the frequency modulated video signal a supplied thereto from the playback equalizer circuit 12 and the frequency of the first or second reference frequency signal supplied thereto from the reference frequency signal generator circuit 32 and produces the drop-out detecting signal e when the frequency of the frequency modulated video signal a is lower than that of the first or second reference frequency signal. Thus, according to the second embodiment of the invention shown in FIG. 6, it can be avoided that upon normal reproduction mode the peak portion of the emphasized video signal at its black level side is mis-detected as the drop-out. Further, when upon reproduction with variable tape speed the magnetic head scans over the two slant tracks across the guardband portion at the same time, it is possible to positively detect the drop-out.

According to the present invention, as set forth above, in any one of the normal reproduction mode and the reproduction mode with variable tape speed, the drop-out can be detected under the optimum condition.

The above description is presented by way of example on the preferred embodiments of the invention and it will be apparent that many modifications and variations thereof could be effected by one with ordinary skill in the art without departing from the spirit and scope of the novel concepts of the invention so that the scope of the invention should be determined only by the appended claims.

We claim as our invention:

1. A method of detecting a drop-out of a frequency modulated video signal reproduced by a reproducing head from slant tracks on a tape, comprising the steps of;
    forming an envelope of the frequency modulated video signal, said envelope having an amplitude that depends on whether the reproducing head is scanning properly over one of the slant tracks in normal playback or is scanning between two tracks;
    detecting the amplitude of said envelope to determine whether the reproducing head is scanning properly over one of the slant tracks in normal playback or is scanning between two tracks;
    detecting whether a frequency of the frequency modulated video signal is lower than a first predetermined frequency in a lower side band frequency region of the frequency modulated video signal when the reproducing head is scanning properly over the slant tracks in normal playback and whether a frequency of the frequency modulated video signal is lower than a second predetermined frequency between the lower side band frequency region and a carrier frequency region of the frequency modulated video signal when said reproducing head is scanning between two tracks; and
    generating a drop-out detecting output signal when the frequency of the frequency modulated video signal is lower than said first predetermined frequency when the reproducing head is scanning properly over one of the slant tracks in normal playback or lower than said second predetermined frequency when the reproducing head is scanning between two tracks.

2. A drop-out detecting circuit for detecting a drop-out of a frequency modulated video signal reproduced by a reproducing head from slant tracks on a tape, comprising:

means for forming an envelope of the frequency modulated video signal, said envelope having an amplitude that depends on whether the reproducing head is scanning properly over one of the slant tracks in normal playback or is scanning between two tracks;

first detecting means responsive to said envelope for detecting whether the reproducing head is scanning properly over one of the slant tracks in normal playback or is scanning between two tracks; and second detecting means for detecting whether a frequency of the frequency modulated video signals is lower than a first predetermined frequency in a lower side band frequency region of the frequency modulated video signal when said first detecting means detects that said reproducing head is scanning properly over one of the slant tracks in normal playback and whether the frequency of the frequency modulated video signal is lower than a second predetermined frequency between said lower side band frequency region and carrier frequency region of said frequency modulated video signal when said first detecting means detects that said reproducing head is scanning between two tracks, said second detecting means generating a drop-out detecting output signal if the frequency of the frequency modulated video signal is lower than said first predetermined frequency when the reproducing head is scanning properly over one of the slant tracks in normal playback or lower than said second predetermined frequency when the reproducing head is scanning between two tracks.

3. A drop-out detecting circuit for detecting a drop-out in a frequency modulated video signal reproduced from a slant track on a tape, said circuit comprising:

means for generating a first reference level having a given polarity;

means for generating a second reference level lower than said first reference level but having said given polarity;

means responsive to the frequency modulated video signal for forming an envelope signal corresponding to the frequency modulated video signal;

first level comparing means directly responsive to the envelope signal for making a first comparison of the envelope signal with the first reference level and generating an output signal having a reference period that depends on said first comparison;

second level comparing means directly responsive to the frequency modulated video signal for making a second comparison of the frequency modulated video signal with the second reference level and generating a rectangular waveform output signal having a period that depends on said second comparison; an period detecting means responsive to said period of the rectangular waveform signal and to said reference period for generating a drop-out detecting signal in accordance with the relation of said period of the rectangular waveform signal to the period of said reference signal.

* * * * *

UNITED STATES PATENT AND TRADEMARK OFFICE
CERTIFICATE OF CORRECTION

PATENT NO. : 5,050,002
DATED : September 17, 1991
INVENTOR(S) : Hideto Suzuki; Teruyuki Yoshida; Hideki Arai It is certified that error appears in the above-identified patent and that said Letters Patent is hereby corrected as shown below:

On the Title page:

In <u>References Cited</u>, Patent No. 4,623,994, change "Nabshima" to --Nabeshima--

Col. 2, line 9, delete "C."
      line 13, after "180°" delete ","

Col. 3, line 11, change "bank" to --band--

Col. 5, line 23, change "H" to --1H--

Col. 6, line 65, change "of $\lambda$" to --$\lambda$ of--

Col. 8, line 1, delete "or" first occurrence
      line 4, change "generate" to --generates--

Col. 8, line 41, change ";" to --:--

UNITED STATES PATENT AND TRADEMARK OFFICE
CERTIFICATE OF CORRECTION

PATENT NO. : 5,050,002                           Page 2 of 2

DATED : September 17, 1991

INVENTOR(S) : Hideto Suzuki; Teruyuki Yoshida; Hideki Arai

It is certified that error appears in the above-identified patent and that said Letters Patent is hereby corrected as shown below:

```
Col. 9, line 19, change "signals" to --signal--
        line 28, after "and" insert --a--
Col. 10, line 27, change "an" to --and--
```

Signed and Sealed this

Sixth Day of April, 1993

*Attest:*

STEPHEN G. KUNIN

*Attesting Officer*          *Acting Commissioner of Patents and Trademarks*